Patented Apr. 25, 1950

2,505,325

UNITED STATES PATENT OFFICE 2,505,325

PROCESS OF PREPARING EXPLODED CEREAL GRAIN

John William Hubbard, New York, N. Y., assignor to Alaska Pacific Salmon Company, Seattle, Wash., a corporation of Nevada No Drawing. Application February 14, 1944, Serial No. 522,374

7 Claims. (Cl. 99—81)

The present invention relates to a novel process for treating alimentary organic substances, especially raw cereals, grains, seeds, legumes, etc., and, more particularly, to a process for heat-treating rice, and to the product of said process.

Many attempts were formerly made to treat rice and other cereal grains in order to make them quick-cooking while leaving them in a condition suitable for storage and transshipment. Prior art methods were, in general, directed to a pre-cooking treatment at relatively low temperatures, and such processes produced an inferior product and were time-consuming, wasteful of space and not adapted to large-scale continuous operation. Moreover, in the case of unpolished grains from which the cortices were not removed prior to treatment, a "case-hardening" effect frequently resulted which gave a heterogeneous and unmerchantable product.

The coffee-roasting art has also been seeking a method for continuous operation which would be practicable on an industrial scale. The almost universal practice has been to roast green coffee for a twenty to thirty minute period and in batch operation. Prior art attempts even to shorten this time period provided a generally unsatisfactory product lacking in homogeneity and in uniformity of color.

It is an object of the present invention to provide a novel process for heat-treating alimentary organic substances in a relatively short time and, preferably, in continuous operation.

It is also an object of this invention to provide a new process for cooking rice and other cereals and grains rapidly and completely with removal of moisture normally present and with retention of a high proportion of vitamins and other vital factors.

It is another object of the invention to provide pre-cooked cereal products requiring at most a relatively short additional cooking time and being suitable for shipment and storage for considerable periods without appreciable spoilage.

A further object of the invention is to provide a relatively dry, substantially completely cooked, white rice similar in appearance to uncooked white rice and adapted for human consumption after being subjected to only about five minutes' additional cooking in a relatively small amount of water.

The present invention also contemplates the provision of heat-treated brown rice of distinctively pleasant flavor and suitable for human consumption with or without subsequent cooking.

Moreover, the invention provides roasted coffee beans containing a relatively high proportion of oils and flavoring principles, whereby aqueous coffee extracts of unusual flavor and aroma can be obtained therefrom.

Other objects and advantages of this invention will be apparent from the following description.

According to the present invention, alimentary organic substances, especially those in a substantially raw state, are contacted with a hot gas for a relatively short period of time, generally about thirty seconds to about two minutes. The material to be treated is preferably thoroughly agitated during such contact and may be advanced in concurrent or countercurrent flow with respect to a stream of hot gas employed. The temperature of the gas and the time of treatment vary, of course, depending upon the particular substance selected. In general, however, in treating cereals, a high enough temperature is provided in order completely to cook the cereal and to remove moisture therefrom in an extremely short time period, usually under a minute. However, the temperature is not so high as to cause substantial charring or other deterioration or decomposition of the cereal or grain. Temperatures of 650° F. to 1200° F., depending upon the type of cereal and its moisture content, are usually suitable.

Where a cereal grain from which the cortex or shell has not been removed is employed, a treating temperature is selected which is sufficiently high to cause the formation of steam within the shell by vaporization of the moisture therein at too rapid a rate for gradual permeation of the outer shell or membrane. This results in a building up of steam pressure within the grain and an explosion of the grain. If the grain has lost part of its natural moisture through long storage in an arid climate or from other causes, it may be necessary to rehumidify it to a partial extent in order that sufficient steam be formed. It is believed that the rapid high-temperature treatment of this invention provides an extremely rapid pressure-cooking of each individual grain of the cereal. The cereal may then be subjected to the high temperature of the process for a further period of time sufficient to toast the outer surface thereof, but in no case should a temperature and/or time period sufficient to cause undesirable charring or decomposition be employed.

The following example is illustrative of the invention, but it will be understood that the invention is not limited thereon.

Example

A quantity of unpolished brown rice having a moisture content of 14½% is fed at room temperature into one end of a rotating cylindrical drum at a rate of 625 pounds per hour. The cylindrical drum has a diameter of 24 inches and a length of about seven and a half feet, rotates about its longitudinal axis, and is approximately horizontally disposed in a casing. The longitudinal axis is inclined from the horizontal at an angle sufficient to provide the desired pitch for advancing the rice from the feed end to the discharge end of the drum. The pitch and the speed of rotation are adjusted to provide a holding time for rice in the drum of about 50 seconds. The cylinder is equipped with internal ribs or laths adapted to pick up the rice as the drum rotates and to carry it to a higher point before permitting it to fall, thereby providing efficient agitation.

A pair of strip burners within the casing and beneath the drum are employed to produce the heat used in the process, and 500 cubic feet per minute of a hot gaseous mixture of air and combustion products are passed through the drum concurrently with the rice. The gaseous mixture enters the drum at the feed end at 950° F. and is removed at the discharge end at about 685° F. The rice reaches a maximum temperature within the drum and is discharged at a temperature of 350° F.

The rice grains thus produced have increased size, a puffed appearance with part of the inner starch content having blown or exploded through the outer shell, and a toasted surface. The rice product has a moisture content of about 4% and is completely cooked.

After cooling to ordinary temperatures, this improved brown rice product of the invention may be eaten without further processing, having a distinctive, pleasant, nutty flavor, or it may be incorporated in various other food products, such as cakes, chocolates and other candies, etc., in a manner similar to the way nut meats are commonly employed.

When served at a meal as a cereal or as a substitute for or adjunct to potatoes and other vegetables, alimentary pastes, breadstuffs, etc., the brown rice product thus treated is preferably cooked for ten to fifteen minutes for the purpose of adding water and of warming for greater palatability. If desired, the rice may be soaked in cold water for a few hours to add water and to soften the grains and may then be consumed without cooking. A quick-cooking cereal product can be prepared from the treated brown rice by grinding, and the ground product is cooked in two to three minutes.

The white rice product of the invention may also be eaten after being cooked for only sufficient time (say, five to seven minutes) to add water for softening and to warm. The quick processing of the present process and the short additional cooking period permit the retention of vital factors which are normally destroyed by the long cooking required for untreated rice.

It is an advantage of the present process that the high temperatures employed for treating cereal grains are effective in destroying organisms which lead to deterioration, decay and fermentation of various grains, especially if left at normal moisture content. Thus, the products of this invention can be stored for considerable periods, even many months, without appreciable change or substantial deterioration.

Besides the greatly reduced cooking time required of the consumer for bringing the treated rice (white or brown) to the table in highly palatable form, there is an additional advantage to the present product in that the cooking supplied at the point of consumption is for the purposes of warming and softening the rice, not for increasing its digestibility. Formerly, many consumers avoided preparing rice in a way to produce a firmer product because of their knowledge that it was undercooked. In preparing the present product, any degree of firmness or softness desired may be attained with full confidence that the rice is thoroughly cooked.

Moreover, only enough water need be used in cooking the rice to furnish the water desired for absorption therein. Unlike untreated rice, which requires a large excess of water to prevent sticking, it is preferred to cook the treated rice in a minimum amount of water, all of which can be absorbed, thereby avoiding the necessity of draining off water-soluble vitamins, minerals and other vital factors.

Where a roasting effect, as in the treating of coffee, is desired, the temperature and time of treatment are adjusted to produce the desired result. The coffee is preferably tumbled in a rotating cylinder inclined at a pitch sufficient to pass the coffee beans therethrough in approximately 75 to 100 seconds, say about 90 seconds, and heated air containing gaseous combustion products is passed through the cylinder concurrently with the coffee in the proportion of about 50 cubic feet of air per pound of coffee beans. The air, upon entering the cylinder, is at a temperature of approximately 550° F. The roasted coffee is of a rich brown color and contains oils which the slow-roasting processes of the prior art destroy. The presence of said oils in the roasted coffee beans of this invention provides an aqueous extract which has unusually fine flavor and aroma.

Although the present invention has been described with respect to certain embodiments and examples, it will be appreciated by those skilled in the art that variations and modifications may be made therein and that various equivalents may be substituted therefor without departing from the spirit of the invention. Thus, although the process of producing a toasted product has been described in connection with a single passage in contact with a hot gas for removing moisture and cooking and for toasting, it will be understood that the material to be treated may be passed in contact with hot gas more than once and/or that various degrees of toasting (or roasting) may be attained either in a single pass or in multiple passes.

Similarly, while the process has been described with reference to the treating of rice and coffee beans, it is also applicable to the treatment of corn, wheat, barley, rye, oats, beans, peas, lima beans, soy beans, etc. These and other variations and modifications are believed to be within the scope of the present specification and within the purview of the appended claims.

I claim:

1. A process for treating rice which comprises continuously passing a stream of rice grains through a treating zone, agitating said grains therein, continuously passing a stream of heated air through said zone in concurrent contact with the stream of rice grains, said air stream being introduced into said zone at a temperature of about 950° F., correlating the rate of rice passing through said zone with the volume rate of heated air passing therethrough to cook said rice grains and to remove water therefrom in a time period of up to about a minute, and removing the rice grains from contact with the heated air when substantially cooked and before substantial charring and decomposition.

2. A process for treating brown rice which comprises continuously passing a stream of grains of unpolished brown rice containing about 14% moisture through a treating zone at a rate of about 625 pounds per hour, agitating said grains therein, continuously passing a stream of heated air through said zone at a rate of about 500 cubic feet per minute in concurrent contact with the stream of brown rice, said air stream being introduced into said zone at a temperature of about 950° F., and continuously removing the brown rice grains from contact with the heated air after a period of about 50 seconds, whereby exploded and toasted brown rice grains are produced.

3. A process for treating cereals which comprises contacting during agitation a continuous stream of a substantially raw cereal with a stream of hot dry air at a temperature of about 650° F. to about 1200° F. for a period of time at least sufficient to cook said cereal up to about a minute, said temperature and time being correlated for substantially completely cooking said cereal without substantial charring and decomposition.

4. A process for treating cereals which comprises continuously passing a stream of raw unpolished cereal grains having the cortex thereon and containing an amount of moisture substantially equivalent to that naturally present in the raw cereal through a heated zone, agitating said grains therein, continuously passing a stream of hot dry air introduced at a temperature of about 650° F. to about 1200° F. through said zone in contact with said stream of cereal grains, whereby the grains are substantially completely cooked and moisture is explosively removed therefrom, and continuously completely removing said cereal grains and said hot air stream from said zone before substantial charring and decomposition of the grains.

5. A process for treating brown rice which comprises continuously passing a stream of raw brown rice containing an amount of moisture substantially equivalent to that naturally present in raw rice through a heating zone in contact with a stream of hot dry air introduced at a temperature of about 650° F. to about 1200° F., whereby the rice is substantially completely cooked and the liberated moisture in the form of steam explodes the rice grains, and continuously completely removing the rice and the hot air stream from the heating zone before substantial charring and decomposition of the rice grains.

6. A process for treating rice grains which comprises continuously passing a stream of rice grains in substantially raw state in contact with a stream of hot dry air introduced at a temperature of about 650° F. to about 1200° F., agitating said stream of rice grains during said contact, and removing the stream of rice grains from said contact after a time period of up to about a minute, said temperature and time period being correlated for substantially completely cooking said rice without substantial charring and decomposition.

7. A process for treating brown rice which comprises continuously passing a stream of grains of raw unpolished brown rice containing an amount of moisture substantially equivalent to that naturally present in the raw rice in contact with a stream of hot dry air introduced at a temperature of about 650° F. to about 1200° F., agitating said stream of brown rice grains during said contact, and removing the stream of grains from said contact after a time period at least sufficient to cook said grains up to about a minute, said temperature and time period being correlated for exploding the rice grains and for toasting said grains without substantial charring and decomposition.

JOHN WILLIAM HUBBARD.

REFERENCES CITED

The following references are of record in the file of this patent:

UNITED STATES PATENTS

| Number | Name | Date |
|---|---|---|
| Re. 12,398 | Johnson | Nov. 7, 1905 |
| 1,377,125 | Gurjar | May 3, 1921 |
| 1,393,997 | Friedman | Oct. 18, 1921 |
| 1,399,920 | Baumgartner | Dec. 13, 1921 |
| 1,702,854 | Simonds | Feb. 19, 1929 |
| 2,124,746 | Plews | July 26, 1938 |
| 2,159,027 | Jalma et al. | May 23, 1939 |
| 2,181,372 | Kellogg | Nov. 28, 1939 |
| 2,185,053 | Dils | Dec. 26, 1939 |
| 2,195,165 | Choppin | Mar. 26, 1940 |
| 2,278,475 | Musher | Apr. 7, 1942 |
| 2,289,529 | Thompson | July 14, 1942 |
| 2,292,255 | Weisberg | Aug. 4, 1942 |
| 2,388,298 | Stephens | Nov. 6, 1945 |